US005851419A

United States Patent [19]

Miyake et al.

[11] Patent Number: 5,851,419

[45] Date of Patent: Dec. 22, 1998

[54] METAL CORROSION INHIBITIVE COOLANT COMPOSITION CONTAINING ALKENYLSUCCINIC ACID OR ALKALI METAL SALT THEREOF

[75] Inventors: Yuji Miyake; Yasuaki Mori, both of Gifu, Japan

[73] Assignee: CCI Co., LTD., Gifu, Japan

[21] Appl. No.: 829,528

[22] Filed: Mar. 28, 1997

[30] Foreign Application Priority Data

Mar. 28, 1996 [JP] Japan .................................... 8-073978

[51] Int. Cl.$^6$ ........................................ C09K 5/00

[52] U.S. Cl. ................................ 252/79; 252/75; 252/76

[58] Field of Search ................................ 252/76, 79, 75

[56] References Cited

U.S. PATENT DOCUMENTS 4,452,715 6/1984 Hirozawa ................................ 252/75
4,743,393 5/1988 Hirozawa ................................ 252/75
5,064,552 11/1991 Oppenlaender et al. .............. 252/78.3

FOREIGN PATENT DOCUMENTS 3701719 8/1988 Germany .

*Primary Examiner*—Christine Skane
*Attorney, Agent, or Firm*—James P. Hanrath

[57] ABSTRACT

An effective metal corrosion inhibitive coolant composition having an excellent pH stabilizing property is disclosed, comprising a glycol as a main ingredient, at least one C 4–C 16 alkenylsuccinic acid or its alkali metal salt in an amount of 0.5–5.0 wt. %, and at least one benzoic acid or its derivative in an amount of 0.5–5.0 wt. %. This coolant composition is further characterized in that no phosphates, amine salts, silicates, borates, or nitrites are contained to avoid their detrimental side effects.

6 Claims, 5 Drawing Sheets

| | EMB. 1 WT. % | EMB. 2 WT. % | EMB. 3 WT. % | COM. 1 WT. % | COM. 2 WT. % | CON. WT. % |
|---|---|---|---|---|---|---|
| OCTENYL SUCCINIC ANHYDRIDE | 2.0 | 2.0 | 2.0 | 4.0 | – | – |
| TOLUIC ACID | 2.0 | – | – | – | 4.0 | – |
| P-TERT-PUTYLBENZOIC ACID | – | 2.0 | 2.0 | – | – | – |
| TOLYLTRIAZOLE | 0.3 | 0.3 | 0.3 | 0.3 | 0.3 | – |
| MAGNESIUM NITRATE | – | – | 0.01 | – | – | – |
| SECBASIC ACID | – | – | – | – | – | 1.0 |
| BENZOIC ACID | – | – | – | – | – | 3.0 |
| SODIUM NITRATE | – | – | – | – | – | 0.2 |
| WATER | 2.0 | 2.0 | 2.0 | 2.0 | 2.0 | 2.0 |
| POTASSIUM HYDROXIDE | 1.88 | 1.70 | 1.70 | 2.13 | 1.62 | 1.92 |
| ETHYLENE GLYCOL | 91.82 | 92.00 | 91.99 | 91.57 | 92.08 | 93.88 |
| pH (30 VOL.%) | 7.8 | 7.8 | 7.8 | 7.8 | 7.8 | 7.8 |

| | EMB. 1 WT. % | EMB. 2 WT. % | EMB. 3 WT. % | COM. 1 WT. % | COM. 2 WT. % | CON. WT. % |
|---|---|---|---|---|---|---|
| OCTENYL SUCCINIC ANHYDRIDE | 2.0 | 2.0 | 2.0 | 4.0 | – | – |
| TOLUIC ACID | 2.0 | – | – | – | 4.0 | – |
| P-TERT-PUTYLBENZOIC ACID | – | 2.0 | 2.0 | – | – | – |
| TOLYLTRIAZOLE | 0.3 | 0.3 | 0.3 | 0.3 | 0.3 | – |
| MAGNESIUM NITRATE | – | – | 0.01 | – | – | – |
| SECBASIC ACID | – | – | – | – | – | 1.0 |
| BENZOIC ACID | – | – | – | – | – | 3.0 |
| SODIUM NITRATE | – | – | – | – | – | 0.2 |
| WATER | 2.0 | 2.0 | 2.0 | 2.0 | 2.0 | 2.0 |
| POTASSIUM HYDROXIDE | 1.88 | 1.70 | 1.70 | 2.13 | 1.62 | 1.92 |
| ETHYLENE GLYCOL | 91.82 | 92.00 | 91.99 | 91.57 | 92.08 | 93.88 |
| pH (30 VOL.%) | 7.8 | 7.8 | 7.8 | 7.8 | 7.8 | 7.8 |

*FIG. 1*

| | | JIS K2234 CRITERIA | EMB. | | | COM. | | CON. |
|---|---|---|---|---|---|---|---|---|
| | | | 1 | 2 | 3 | 1 | 2 | |
| CHANGE IN WEIGHT OF TEST PIECES mg/ SQUARE cm | CAST ALUMINUM | ± 0.30 | -0.07 | -0.06 | -0.05 | 0.38 | -0.10 | -0.11 |
| | CAST IRON | ± 0.30 | 0.00 | 0.02 | -0.01 | 0.04 | -0.01 | -0.03 |
| | STEEL | ± 0.15 | 0.00 | 0.00 | 0.01 | 0.02 | -0.01 | -0.02 |
| | BRASS | ± 0.15 | -0.02 | -0.03 | -0.04 | -0.08 | -0.04 | -0.03 |
| | SOLDER | ± 0.30 | -0.05 | -0.01 | -0.05 | -0.03 | -0.03 | -0.02 |
| | COPPER | ± 0.15 | -0.02 | -0.04 | -0.03 | -0.08 | -0.03 | -0.02 |
| pH/ POST TEST | | 7.8 - 11.0 | 7.8 | 7.8 | 7.9 | 7.8 | 7.6 | 7.8 |
| APPEARANCE OF PIECES AFTER TEST | | | NO CHANGE | NO CHANGE | NO CHANGE | AL PART CORRODED | NO CHANGE | NO CHANGE |

*FIG. 2*

METAL CORROSION INHIBITIVE COOLANT COMPOSITION CONTAINING ALKENYLSUCCINIC ACID OR ALKALI METAL SALT THEREOF

BACKGROUND OF THE INVENTION

1. Field of the Invention

This invention generally relates to a coolant concentrate or composition to be blended generally into coolant fluid in a cooling system of an internal-combustion engine. This invention more particularly relates to a metal corrosion inhibitive coolant composition which does not contain phosphates, amine salts, silicates, borates, or nitrites, all of which are generally regarded detrimental to the environment as well as to the features of coolant or coolant fluid, but possesses an effective buffering in the working range.

2. Background Art

A cooling system for an internal-combustion engine generally and selectively uses aluminum or alloys thereof, cast iron, steel, brass, solder, and copper for its parts. These metals will eventually get corroded through contact with water or air. A number of coolant compositions have been proposed in the past in an attempt to slow or inhibit such metal corrosion by containing metal corrosion inhibitors such as phosphates, amine salts, silicates, borates, and/or nitrites.

However, those ingredients inherently possess certain environmentally detrimental characteristics and somehow deteriorate coolant fluid where they are blended.

Phosphates when they eventually enter rivers or ponds are apt to make the waters excessively nutritive and propagate algae by raising BOD (biochemical oxygen demand) and COD (chemical oxygen demand) of the waters, which often leads to generation of environmentally harmful “red tide” and sludge in the waters. In addition, phosphates will chemically react with hard water substances in coolant fluid and produce deposition, which will result in deterioration of the metal corrosion inhibition properties of the coolant fluid. Further, such deposition may lead to plugging of the passages of cooling systems.

Amine salts are apt to produce nitrosoamine, a believed carcinogenic substance, by chemically reacting with a nitrite when contained together in coolant fluid. Silicates are rather unstable in coolant fluid, and are likely to get gelled when the coolant temperature or pH changes or when other salts coexist, deteriorating the corrosion inhibition function of the coolant fluid. Borates tend to corrode aluminum and aluminum alloys. Nitrites are generally dissipated rapidly, losing together their corrosion inhibitive power.

Simply avoiding use of phosphates, amine salts, silicates, borates, and nitrites in coolant compositions might be an answer to such problems. However, coolant compositions without containing such additives would not provide sufficient buffering action, and the glycols contained as a main ingredient would be oxidized. As a result, the pH of coolant fluid would be lowered, inviting metal liquefaction and corrosion in the coolant fluid even when other metal corrosion inhibitors are contained.

Accordingly, it is an object of the present invention to provide a coolant composition without using phosphates, amine salts, silicates, borates, or nitrites, which can still provide both sufficient buffering and sufficient corrosion inhibition.

SUMMARY OF THE INVENTION

A coolant composition of the present invention contains a glycol as a main ingredient, at least one C 4 to C 16 alkenylsuccinic acid or alkali metal salt thereof in an amount of 0.5–5.0 wt. %, and at least one benzoic acid or derivative thereof (including the alkali metal salts) in an amount of 0.5–5.0 wt. %, further characterized in that essentially no phosphates, amine salts, silicates, borates, or nitrites are contained.

At least one C 4 to C 16 alkenylsuccinic acid or alkali metal salt thereof in an amount of 0.5–5.0 wt. % can provide both an excellent metal corrosion inhibition and buffering in the working range of pH 6.5–8.0. At least one benzoic acid or derivative thereof (including the alkali metal salts) in an amount of 0.5–5.0 wt. % can provide an excellent metal corrosion inhibition, especially for aluminum and iron parts, and contribute to stabilization of hard water.

A magnesium compound or compounds may be added to the coolant composition in an amount of 0.001–0.5 wt. % to improve the metal corrosion inhibition. Such magnesium compounds can provide metal corrosion inhibition especially for aluminum and aluminum alloy parts even when blended with a silicate or phosphate which may be remaining in coolant fluid.

A triazole or triazoles may be added to the coolant composition in an amount of 0.05–1.0 wt. % to improve the metal corrosion inhibition especially for copper parts.

BRIEF DESCRIPTION OF THE DRAWINGS

FIG. 1 is a table showing the ingredients of respective coolant compositions of embodiments 1–3, comparisons 1 and 2, and a control (conventional coolant composition).

FIG. 2 is a table showing the respective metal corrosion inhibitive effects of the coolant compositions in Table 1.

DETAILED DESCRIPTION OF PREFERRED EMBODIMENTS

Figure 3:
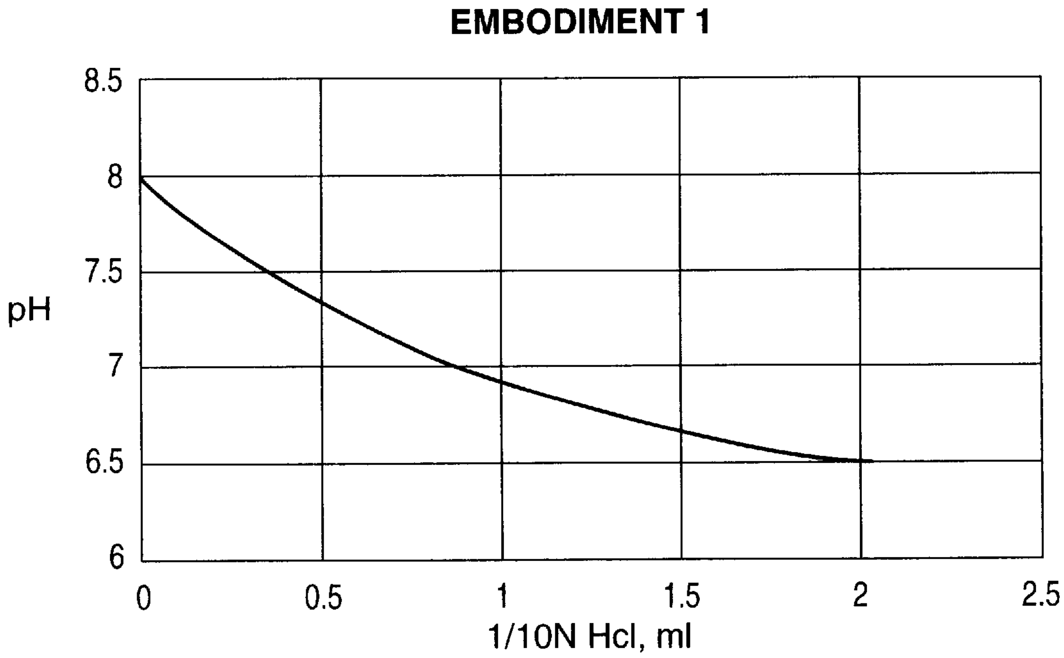
FIG. 3 is a graph showing the change in buffering action of Embodiment 1.

A coolant composition according to the present invention contains a glycol or glycols as a main ingredient. Such glycols include, but are not limited to, ethylene glycol, propylene glycol, 1,3 butylene glycol, hexylene glycol, diethylene glycol and glycerol, among which ethylene glycol and propylene glycol can be preferably used.

The coolant composition additionally contains at least one C 4 to C 16 alkenylsuccinic acid or alkali metal salt thereof in an amount of 0.5–5.0 wt. %. Including less than 0.5 wt. % does not provide sufficient corrosion inhibition or buffering, while including more than 5.0 wt. % does not improve the metal corrosion inhibition economically.

The coolant composition further contains at least one benzoic acid or derivative thereof (including the alkali metal salts) in an amount of 0.5–5.0 wt. %. Such derivatives include, but are not limited to, alkylbenzoic acids such as p-tert-buthylbenzoic acid and toluic acid, phthalic acid, isophthalic acid, o-nitrobenzoic acid, m-nitrobenzoic acid, p-nitrobenzoic acid, cinnamic acid, alkoxybenzoic acid, and the alkali metal salts thereof, among which p-tertbutylbenzoic acid, cinnamic acid, alkoxybenzoic acid and the alkali metal salts thereof are preferred.

At least one benzoic acid or derivative thereof is contained in an amount of 0.5–5.0 wt. %. Including less than 0.5 wt. % does not provide sufficient improvement in metal corrosion inhibition or stabilization of hard water, while including more than 5.0 wt. % does not improve metal corrosion inhibition economically.

A magnesium compound or compounds may be additionally contained in an amount of 0.001–0.5 wt. %. Such magnesium compounds include, but are not limited to, magnesium hydroxide, magnesium oxide, magnesium carbonate, magnesium sulfate, magnesium nitrate, magnesium benzoate, magnesium glutamate, magnesium succinate, magnesium phthalate, magnesium salicylate, magnesium maleate and magnesium chloride. Including less than 0.001 wt. % does not provide sufficient improvement in metal corrosion inhibition, while including more than 0.5 wt. % does not improve the metal corrosion inhibition economically.

A triazole or triazoles may be additionally contained in an amount of 0.05–1.0 wt. % to improve metal corrosion inhibition. Such triazoles include, but are not limited to, tolyltriazole and benzotriazole.

A coolant composition of the present invention can optionally contain an antifoamer and/or coloring. Other known metal corrosion inhibitors such as molybdate, tungstate, sulfate, nitrate, mercaptobenzotriazole, or alkali metal salt or salts thereof may also be optionally added.

Comparison Test

Embodiments 1–3 were prepared according to the present invention, which were compared with Comparisons 1–3 and Control. The respective ingredients of these preparations are given in the table of FIG. 1.

Embodiment 1 consisted of octenylsuccinic anhydride (2.0 wt. %), toluic acid (2.0 wt. %), tolyltriazole (0.3 wt. %), water (2.0 wt. %), potassium hydroxide (1.88 wt. %), and ethylene glycol (91.82 wt. %), adjusted to pH 7.8 (30 vol. %).

Embodiment 2 consisted of octenylsuccinic anhydride (2.0 wt. %), p-tert-butylbenzoic acid (2.0 wt. %), tolyltriazole (0.3 wt. %), water (2.0 wt. %), potassium hydroxide (1.70 wt. %), and ethylene glycol (92.00 wt. %), adjusted to pH 7.8 (vol. %).

Embodiment 3 consisted of octenylsuccinic anhydride (2.0 wt. %), p-tert-butylbenzoic acid (2.0 wt. %), tolyltriazole (0.3 wt. %), magnesium nitrate (0.01 wt. %), water (2.0 wt. %), potassium hydroxide (1.70 wt. %), and ethylene glycol (91.99 wt. %), adjusted to pH 7.8 (30 vol. %).

Comparison 1 consisted of octenylsuccinic anhydride (4.0 wt. %), tolyltriazole (0.3 wt. %), water (2.0 wt. %), potassium hydroxide (2.13 wt. %), and ethylene glycol (91.57 wt. %), adjusted to pH 7.8 (30 vol. %).

Comparison 2 consisted of toluic acid (4.0 wt. %), tolyltriazole (0.3 wt. %), water (2.0 wt. %), potassium hydroxide (1.62 wt. %), and ethylene glycol (92.08 wt. %), adjusted to pH 7.8 (30 vol. %).

Control consisted of sebasic acid (1.0 wt. %), benzoic acid (3.0 wt. %), sodium nitrate (0.2 wt. %), water (2.0 wt. %), potassium hydroxide (1.92 wt. %), and ethylene glycol (93.88 wt. %), adjusted to pH 7.8 (30 vol. %).

Metal corrosion tests were carried out in accordance with the Japanese Industrial Standards (JIS) K 2234-1987 Type-2, which provides criteria for coolant compositions. Those embodiment, comparison and control coolant compositions were diluted to 30 vol. % with water. The metal pieces used in the tests were respectively prepared of cast aluminum, cast iron, steel, brass, solder, and copper.

The test results are shown in FIG. 2. As shown in FIG. 2, Embodiments 1–3, Comparison 2, and Control have shown excellent metal corrosion inhibitions which fall well within the JIS criteria, while Comparison 1 has shown a poorer result. The appearance of the aluminum piece tested for Comparison 1 showed partial roughening on the surfaces.

Figure 4:
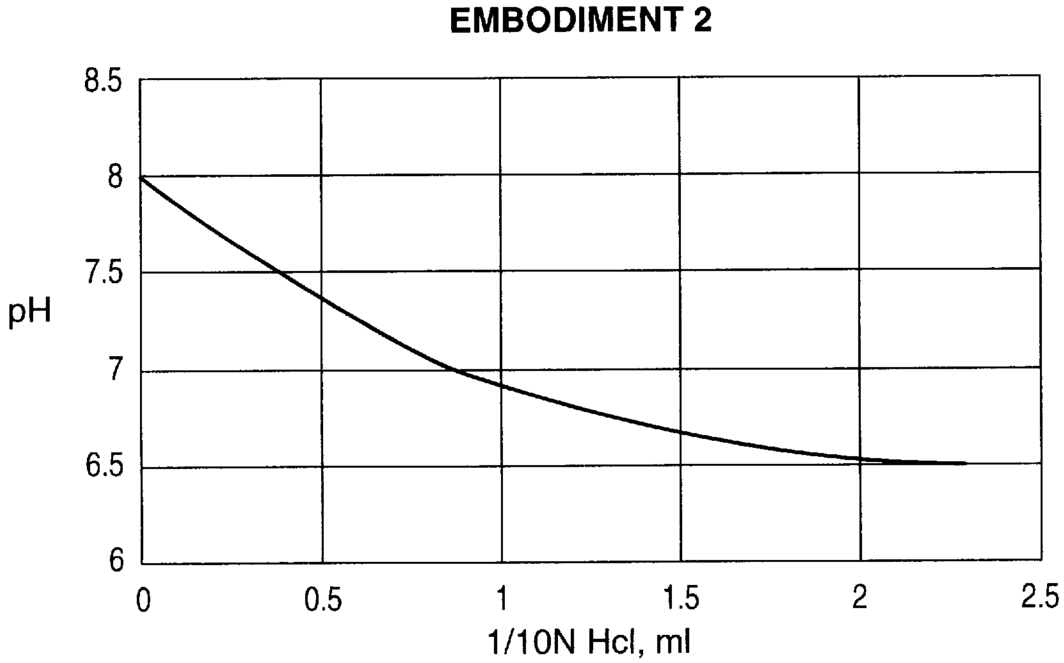
FIG. 4 is a graph showing the change in buffering action of Embodiment 2.
Figure 5:
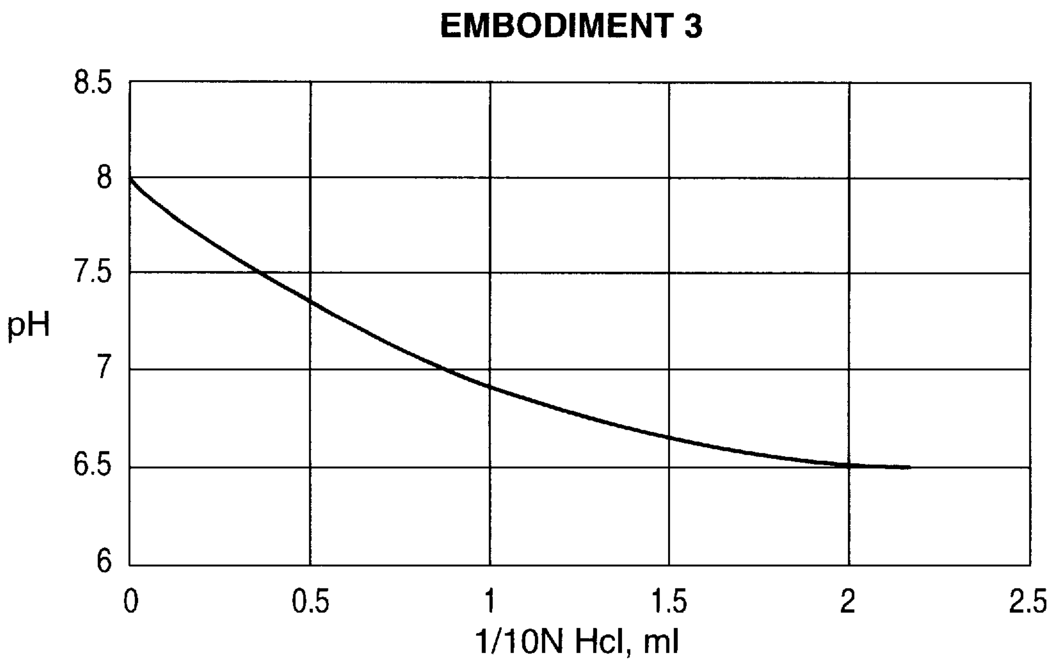
FIG. 5 is a graph showing the change in buffering action of Embodiment 3.
Figure 6:
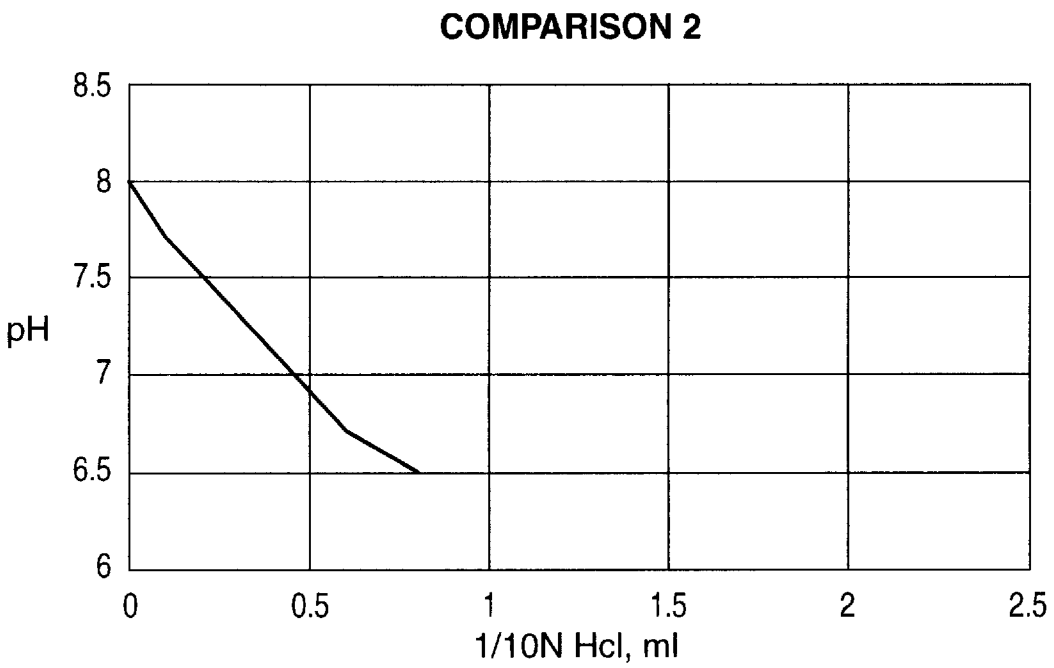
FIG. 6 is a graph showing the change in buffering action of Comparison 2.
Figure 7:
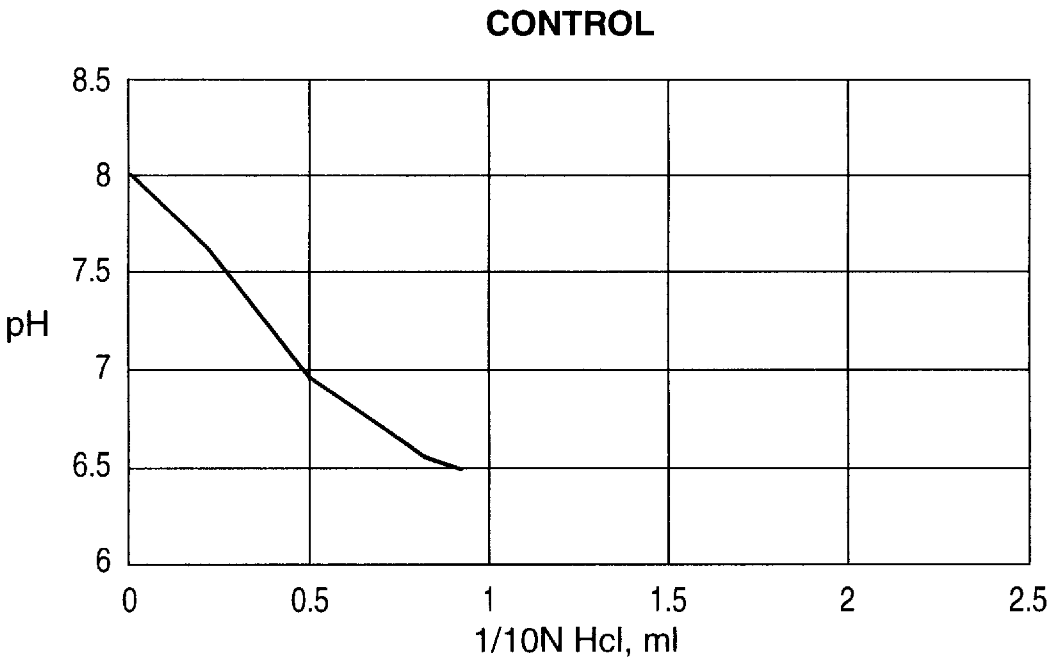
FIG. 7 is a graph showing the change in buffering action of Control.

Buffering tests were then carried out for Embodiments 1–3, Comparison 2 and Control to study their respective buffering actions. All these compositions were diluted to 10 vol. % with water for the tests. A hydrochloric acid solution of 1/10N was dropped intermittently in those solutions and the changes in pH were measured respectively. The results of the drop tests are shown in FIGS. 3–7, wherein FIG. 3 is for Embodiment 1, FIG. 4 is for Embodiment 2, FIG. 5 is for Embodiment 3, FIG. 6 is for Comparison 2, and FIG. 7 is for Control.

These figures show that Embodiments 1–3 retained their pH values very well (changes were slow) and their values hardly changed after around pH 6.5, while the pH values of Comparison 2 and Control rapidly went below pH 6.5.

Comparison 2 and Control both arrived at a low pH, near pH 6.5, with much less hydrochloric acid than Embodiments 1–3. Five to six times as much hydrochloric acid was added to Embodiments 1–3 before their respective pH values dropped to around pH 6.0.

These tests show that coolant compositions such as Embodiments 1–3, namely, comprising proper amounts of a glycol or glycols, at least one C 4 to C 16 alkenylsuccinic acid or alkali metal salt thereof, and at least one benzoic acid or derivative thereof (including the alkali metal salts), can provide excellent metal corrosion inhibition together with excellent buffering action.

While the preferred embodiment of the invention has been described, modifications can be made and other embodiments may be devised without departing from the spirit of the invention and the scope of the appended claims.

What is claimed is:

1. A coolant composition consisting essentially of a glycol as a main ingredient, at least one C 4 to C 16 alkenylsuccinic acid or alkali metal salt thereof in an amount of 0.5–5.0 wt. %, and at least one benzoic acid or derivative thereof in an amount of 0.5–5.0 wt. %, further characterized in that no phosphates, amine salts, silicates, borates, or nitrites are included.

2. The coolant composition of claim 1, further consisting essentially of at least one magnesium compound in an amount of 0.001–0.5 wt. %.

3. The coolant composition of claim 1, further consisting essentially of at least one triazole in an amount of 0.05–1.0 wt. %.

4. The coolant composition according to claim 1 wherein said benzoic acid or derivative thereof is selected from the group consisting of p-tert butylbenzoic acid, toluic acid, phthalic acid, isophthalic acid, o-nitrobenzoic acid, m-nitrobenzoic acid, p-nitrobenzoic acid, cinnamic acid, alkoxybenzoic acid, and the alkali metal salts thereof.

5. The coolant composition according to claim 2 wherein said magnesium compound is selected from the group consisting of magnesium hydroxide, magnesium oxide, magnesium carbonate, magnesium sulfate, magnesium nitrate, magnesium benzoate, magnesium glutamate, magnesium succinate, magnesium phthalate, magnesium salicylate, magnesium maleate, magnesium chloride.

6. The coolant composition according to claim 3 wherein said triazole is tolyltriazole or benzotriazole.

* * * * *